United States Patent [19]

Biddy

[11] Patent Number: 4,989,918

[45] Date of Patent: Feb. 5, 1991

[54] MATERIAL HANDLING VEHICLE WITH IMPROVED TAILGATE

[76] Inventor: Darrell W. Biddy, 8241 Tuckaseegee Rd., Charlotte, N.C. 28214

[21] Appl. No.: 393,378

[22] Filed: Aug. 14, 1989

[51] Int. Cl.$^5$ ............................................. B60P 1/26
[52] U.S. Cl. ................................. 298/23 MD; 296/51
[58] Field of Search ............ 298/23 MD, 23 R, 23 A, 298/23 S, 23 D, 23 M; 296/50, 51, 56; 222/554, 556

[56] References Cited

U.S. PATENT DOCUMENTS 3,548,540  12/1970  Cullings .......................... 298/23 MD
4,699,428  10/1987  Vick ................................ 298/23 D

FOREIGN PATENT DOCUMENTS 2145431  3/1973  Fed. Rep. of Germany ... 298/23 A
0039934  4/1981  Japan ............................ 298/23 MD
8805479  7/1988  Sweden ............................. 298/23 R Primary Examiner—Robert J. Spar
Assistant Examiner—James T. Eller
Attorney, Agent, or Firm—Bell, Seltzer, Park & Gibson

[57] ABSTRACT

A material handling vehicle is disclosed which includes a substantially rectangular material container with an open rear end. The container is pivotably mounted to the vehicle frame so that the front end of the container can be lifted to cause material in the container to be discharged through the open rear end. A tailgate is mounted to the open rear end of the container and can be selectively moved between a closed position where the tailgate overlies and closes the open rear end of the container, a partially raised position to permit metering of a material therethrough, and a fully raised position where the tailgate is free to swing outwardly about a pivotal axis. A pair of hydraulically actuated lifting members selectively move the tailgate between the three positions.

6 Claims, 4 Drawing Sheets

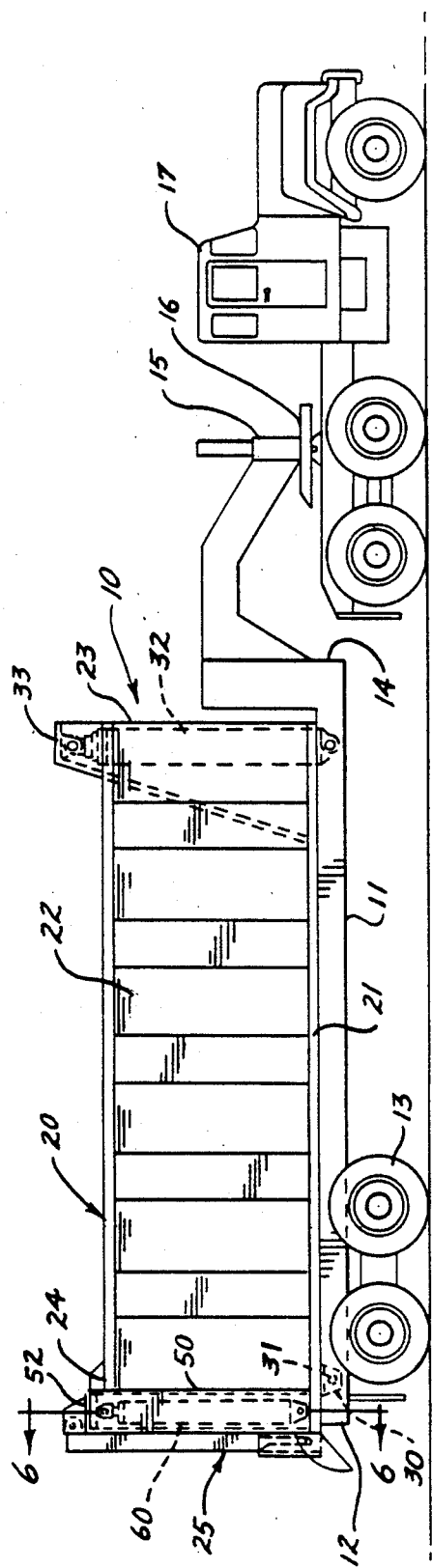
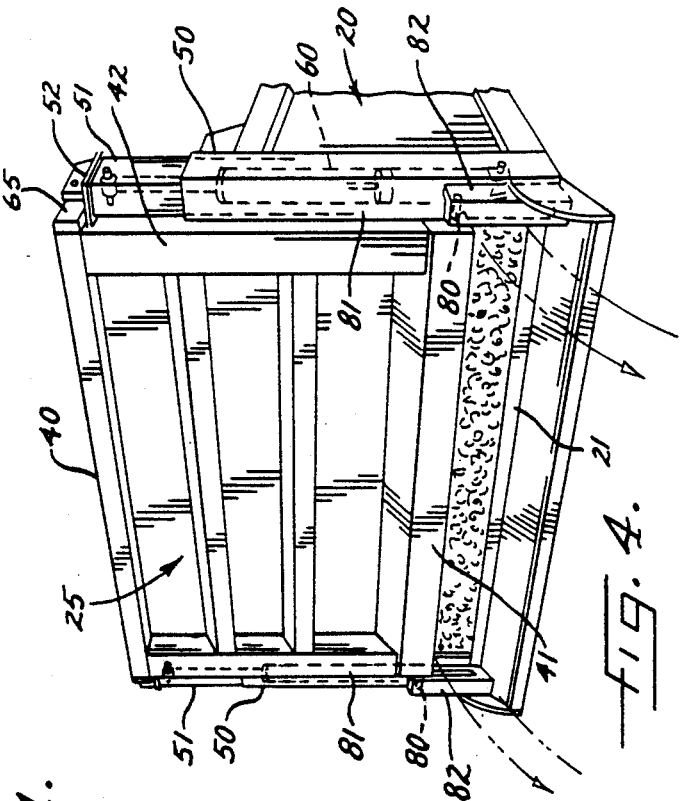
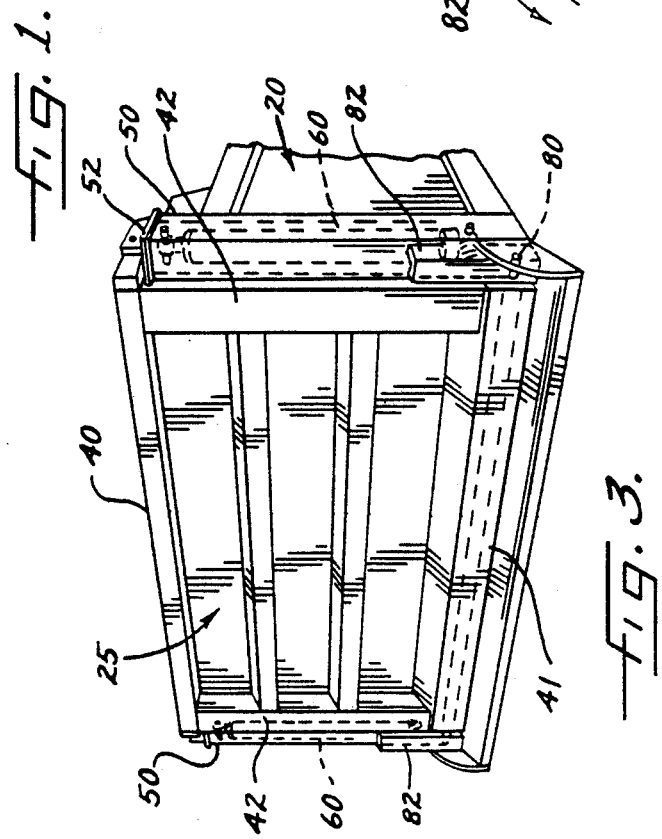

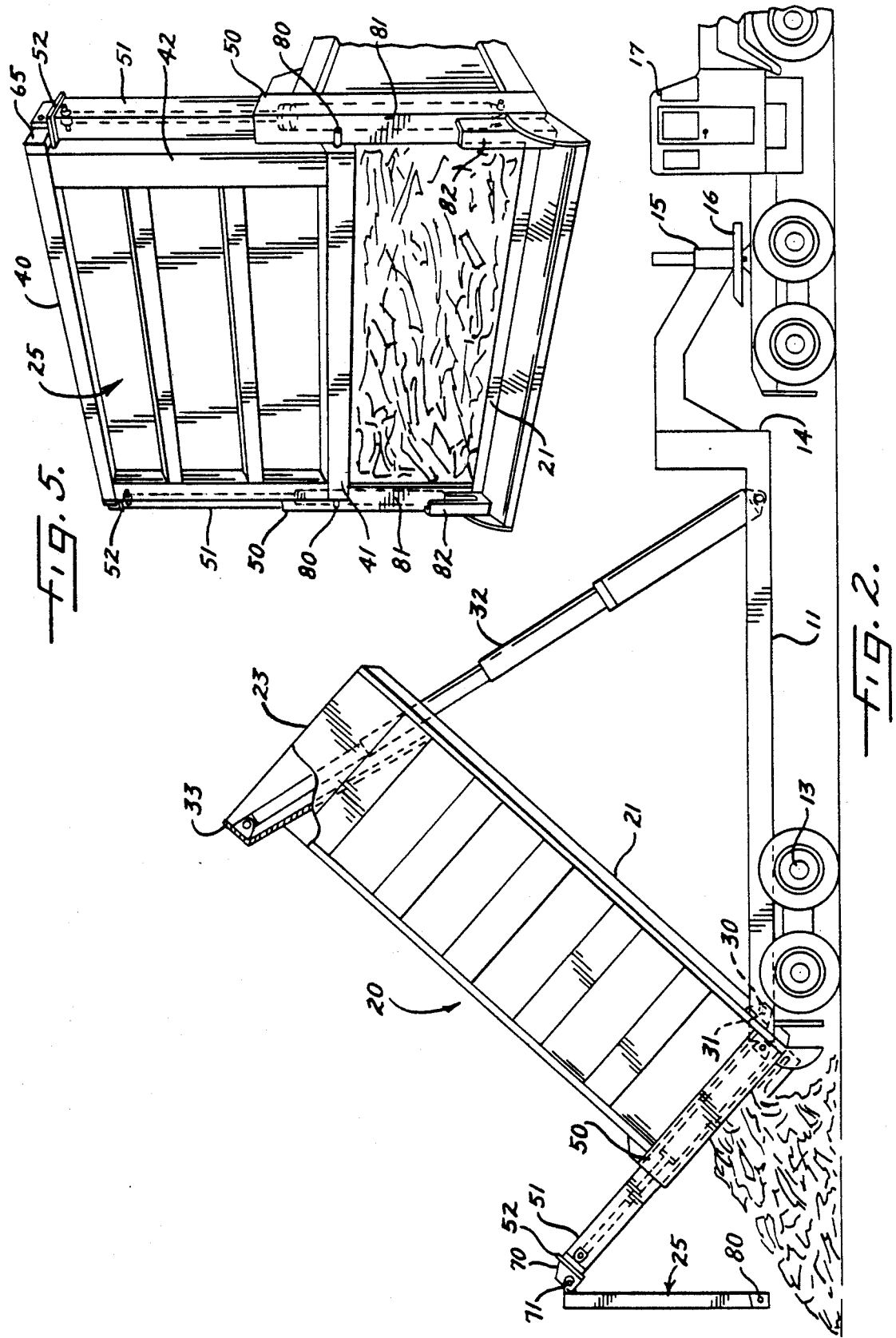

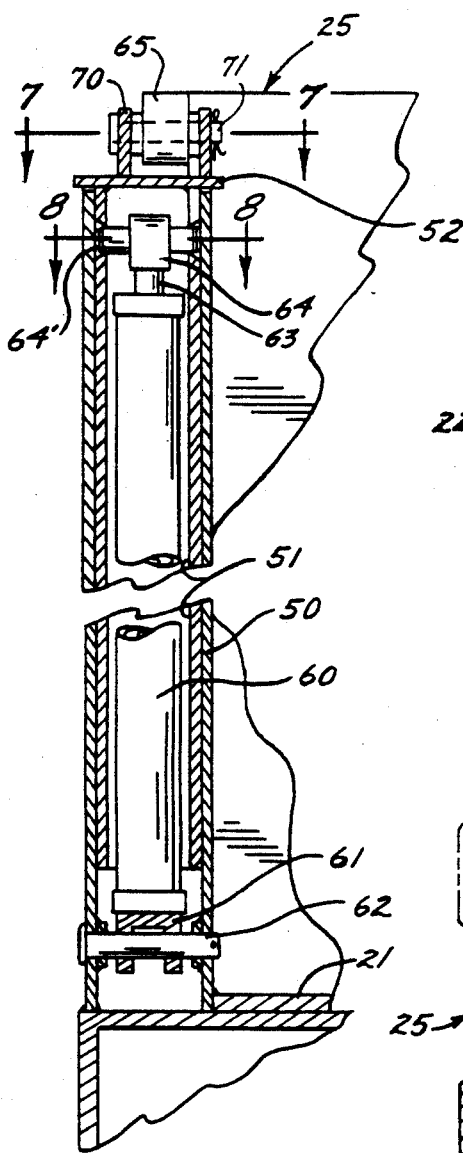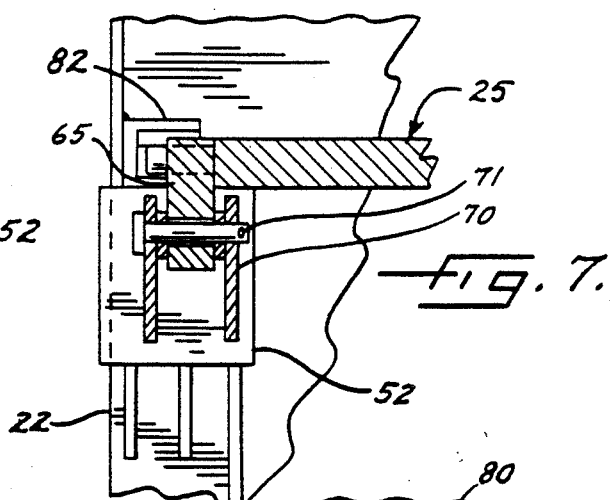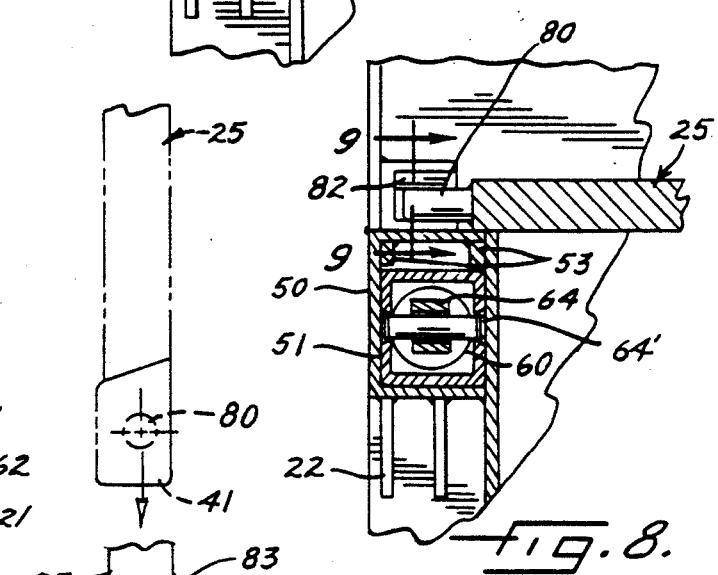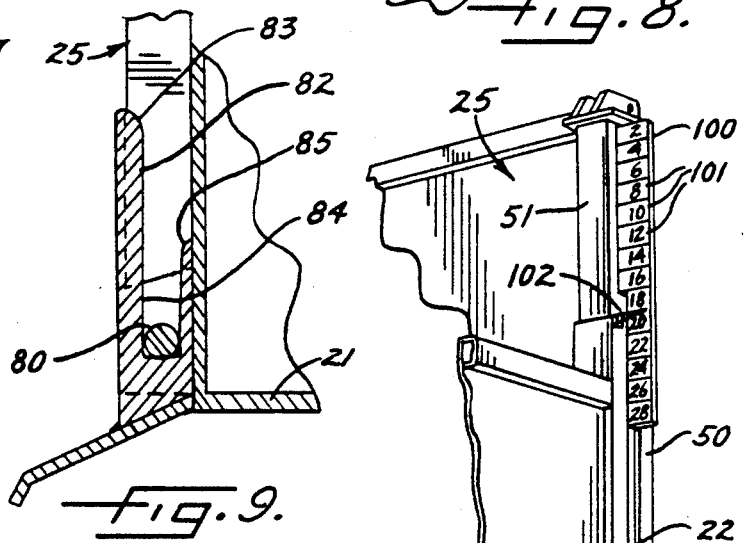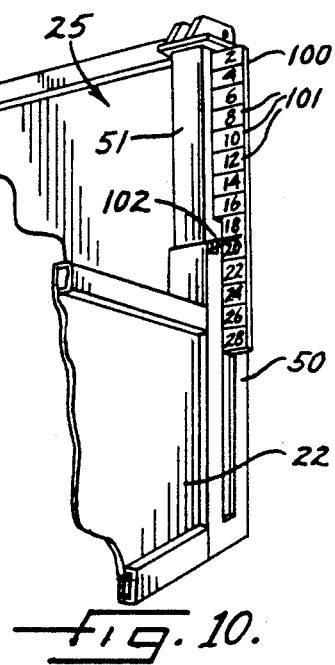

MATERIAL HANDLING VEHICLE WITH IMPROVED TAILGATE

FIELD OF THE INVENTION

This invention relates to material handling vehicles and more particularly to material handling vehicles having a material container pivotably mounted to a frame and a tailgate mounted to the open rear end of the material container.

BACKGROUND OF THE INVENTION

Material handling vehicles commonly include a material container for holding refuse, trash, or an aggregate material. Typically, the material container is substantially rectangularly configured and includes a closed front end and open rear end and tailgate through which material in the container can be discharged therethrough. The container usually is mounted to a vehicle frame, and depending on the type of material handling vehicle desired, each mounting system varies. For example, some material containers are pivotably mounted to the vehicle frame, such as a dump truck, to facilitate ready withdrawal of the contents in the container by allowing the contents to slide outwardly through the open rear end when the material container is pivoted and the front end is raised. Other material containers are fixed relative to the frame such as some commercially available trash compactors.

Additionally, the construction of the tailgate varies to suit the function of the vehicle. For example, many commercially available dump trucks have a tailgate which pivots outwardly to facilitate dumping when the material container front end is raised. U.S. Pat. No. 4,067,466 to Parks et al discloses another pivoting tailgate positioned on the material container of a refuse compactor. The material container is fixedly mounted to the truck frame and the coordinated movement of a compaction and discharge blade provides refuse compaction and then discharge. The tailgate includes a vertically raisable top section having a lower section pivotably connected thereto. As the upper section is raised, the lower section is free to pivot outwardly, thus providing a full discharge path for the compacted refuse. In another refuse compactor disclosed in U.S. Pat. No. 3,966,096 to Worthington, the material container is adapted for use on small trucks. The tailgate is designed to prevent a quick, uncontrolled discharge or dumping so that refuse material can be controllably metered into a much larger conventional refuse vehicle. The container rear end and the tailgate both are vertically and selectively movable. The tailgate does not pivot and the amount of discharged refuse is controlled by the selected size of the rear opening. Similar designs are used on trucks adapted to meter sand, salt or other aggregate material on a roadway.

One drawback of the aforementioned prior art material handling vehicles is their limited function. Each vehicle is constructed to provide only one means of discharge, i.e. either a controlled metering of discharged refuse or other aggregate material contained within the material container, or a less controlled, quicker discharge of material which is facilitated by an outwardly pivoting tailgate, such as a dump truck. It has been determined that a more general material handling vehicle is desirable which is constructed so that the material container and tailgate can provide not only a controlled metering of material therefrom, but also provide a less controlled, quicker discharge of material when needed.

With the foregoing in mind, it is therefore an object of the present invention to provide a material handling vehicle which overcomes the aforementioned deficiencies of the prior art.

It is another object of the present invention to provide a material handling vehicle which includes a pivotably mounted material container having a tailgate sized to close the open rear end of the container and where the tailgate can be selective moved between a closed position, a partially raised position so as to permit metering of material therethrough, and a fully raised position where the tailgate is free to swing outwardly to facilitate complete discharge of material.

SUMMARY OF THE INVENTION

These and other objects and advantages of the present invention are accomplished by a material handling vehicle which includes a frame mounted on wheels for permitting travel along a roadway. A substantially rectangular material container which has a bottom wall, opposite side walls, a front end wall, and a open rear end is pivotally mounted to the frame for pivotal rotation about a transverse axis so as to lift the front end of the container and cause material in the container to be discharged through the open rear end. A one piece, generally rectangular tailgate is sized to close the open rear end of the container. The tailgate includes parallel upper and lower edges, and parallel opposite side edges.

The tailgate is mounted to the container for permitting the tailgate to be selectively moved between (1) a closed position where the tailgate overlies and closes the open rear end of the container, (2) a partially raised position where the bottom edge of the tailgate is spaced above the bottom wall of the container and so as to permit the metering of a material therethrough, and (3) a fully raised position where the tailgate is free to swing outwardly about a pivotal axis which extends parallel to and closely adjacent the upper edge of the tailgate. Vertically disposed hydraulic lifting members selectively move the tailgate between the three positions.

BRIEF DESCRIPTION OF THE DRAWINGS

Some of the objects and advantages of the invention having been stated, other objects will appear as the description proceeds when taken in conjunction with the accompanying drawings in which:

FIG. 1 is a side view of the material handling vehicle in accordance with the present invention.

FIG. 2 is a side view of the material handling vehicle showing the front end of the material container lifted and the tailgate in a fully raised position so that the tailgate is free to swing outwardly.

FIG. 3 is a perspective end view of the material handling vehicle showing the tailgate in a fully closed position and guide rods engaged in the guide channels.

FIG. 4 is a perspective end view of the material handling vehicle showing the tailgate in a partially raised position for permitting the metering of material therethrough.

FIG. 5 is a perspective end view of the material handling vehicle showing the tailgate in a fully raised position where the guide rods are disengaged from the guide channels.

FIG. 6 is a sectional view taken along line 6—6 of FIG. 1 and showing the sleeve, the post slidably received in the sleeve, the hydraulic cylinder, and the tailgate pivotably mounted to the post.

FIG. 7 is a sectional view taken along line 7—7 of FIG. 6 and showing in detail the pivotable interconnection of the tailgate and post.

FIG. 8 is a sectional view taken along line 8—8 of FIG. 6 and showing in detail the outside dimensions of the post relative to the inside dimensions of the sleeve into which the post is slidably received.

FIG. 9 is a sectional view taken along line 9—9 of FIG. 8 showing in detail the engagement of a guide pin into a guide channel.

FIG. 10 is a rear perspective view looking from the direction of the left front of the vehicle showing the indicia used to indicate the elevation of the tailgate.

DETAILED DESCRIPTION OF THE PREFERRED EMBODIMENT

Figure 11:
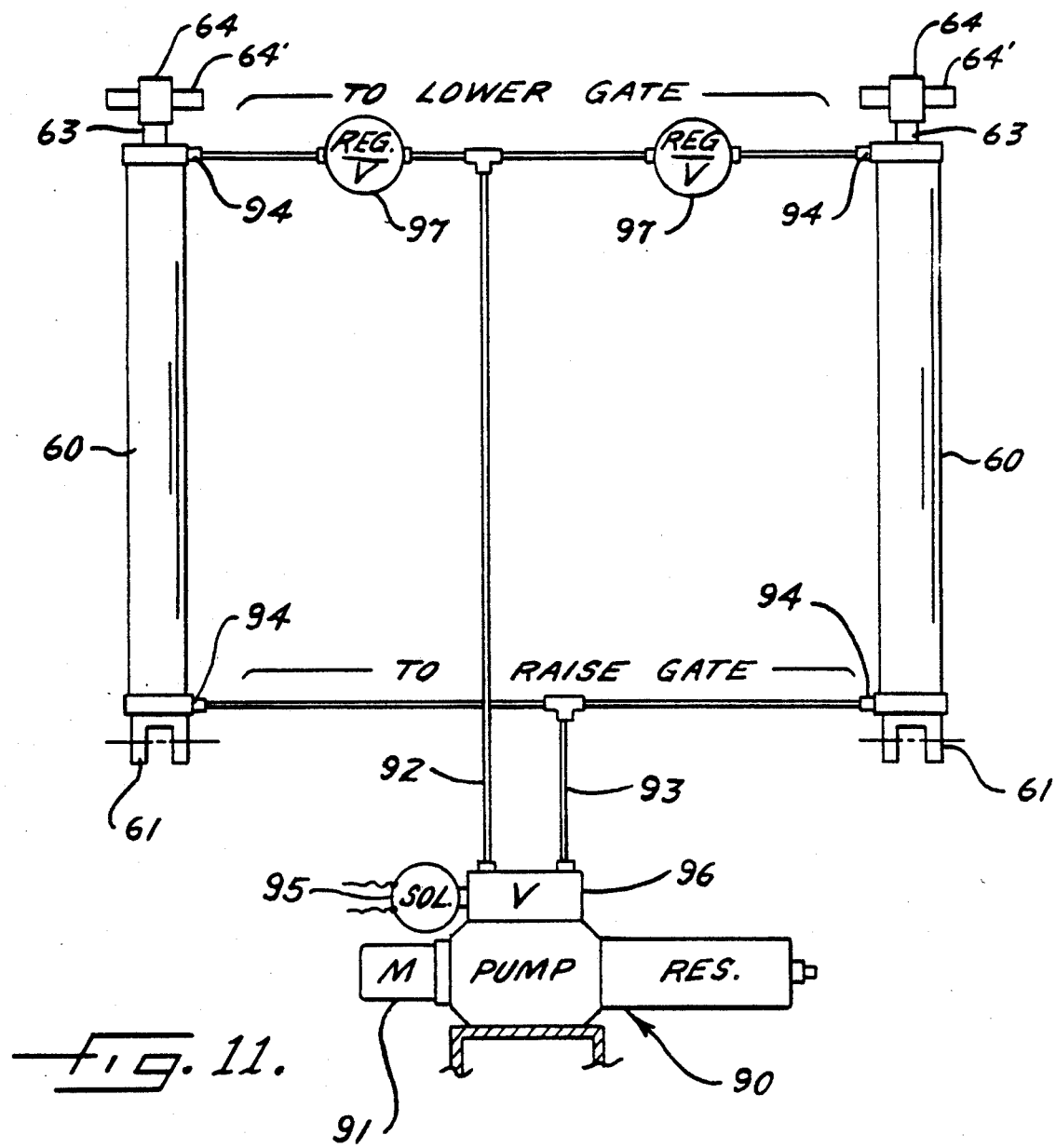
FIG. 11 is a schematic representation of the hydraulic system used to raise and lower the tailgate.

Referring now to the drawings and more particularly to FIG. 1, there is illustrated one preferred construction of the material handling vehicle 10 in accordance with the present invention. As illustrated, the vehicle includes a frame 11 of the type conventionally used with large compaction trailers and other similar material handling vehicles. The frame includes a rear end 12 supported on tandem axle and wheel assemblies 13 and a front end 14 having a cantilevered connection member 15 adapted for attachment to the third wheel assembly 16 of a conventional tractor trailer cab 17. Although the illustrated embodiment shows a separate frame which connects to the third wheel assembly 16 of a tractor-trailer cab, the present invention is not restricted to the use of a separate frame. The elongated frame of some heavy truck beds also can be used.

A material container 20 is mounted to the frame 11. As is conventional, the material container 20 is substantially rectangularly configured and includes a bottom wall 21, opposite side walls 22, and a front end wall 23 interconnecting bottom and side walls 21, 22. The top is open for allowing refuse or other aggregate material to be placed therein. Additionally, as is conventional, the rear end 24 is open, and includes a tailgate 25 enclosing the open rear end.

The rear 24 of the material container is pivotably mounted to the rear 12 of the frame. The bottom wall 21 of the material container 20 includes bracket plates 30 which interconnect pins 31 secured to the frame 11. At the front of the frame, a hydraulic ram 32 interconnects the frame 11 and a front reinforcing plate 33 positioned adjacent the front end wall 23. The hydraulic ram 32 is controlled by conventional hydraulic means and control means which can be located in the truck cab 17 so that the driver can obtain ready access to the controls. As the hydraulic ram 32 extends, the container front end is lifted to allow the material container 20 to rotate about the transverse axis through the pins 31 to lift the front end of the container and cause material therein to be discharged through the open rear end.

In accordance with the present invention, the material container 20 includes the tailgate 25 which is a one piece, generally rectangular member sized to close the open rear end of the container. The tailgate 25 includes respective parallel upper and lower edges 40, 41 and parallel, opposite side edges 42. As will be explained in detail later, the tailgate 25 is mounted at the rear of the container 20 and can be selectively moved between a closed position where the tailgate overlies and closes the open rear end of the container (FIG. 3), to a partially raised position where the lower edge 41 of the tailgate is spaced above the bottom walls 21 of the container to permit metering of a material therethrough (FIG. 4), and a fully raised position where the tailgate is free to swing outwardly (FIG. 5).

Referring now more particularly to FIGS. 6–10, the construction and mounting of the tailgate 25 is shown in detail. As is conventional with some material containers 20, a vertically disposed reinforcement member in the form of a rectangularly configured open box sleeve 50 is positioned at each of the side walls 22 adjacent the rear end (FIGS. 8 and 10). Although the box sleeves 50 are conventionally found on many material containers to reinforce the container, any box sleeve can be welded to the side walls adjacent the frame rear end for purposes of the present invention if the particular material container does not include the more conventional reinforcing box sleeves.

A substantially square longitudinal hollow post 51 is slidably received in each box sleeve 50 (FIGS. 6 and 8). Each post 51 is slightly less than the vertical height of each box sleeve 50 and is dimensioned so that each post is vertically movable within the sleeve with minimum interference. Each post 51 also includes a free upper end having a cap plate 52 thereon which is dimensioned to engage the top of the box sleeve 50 to prevent the post from sliding completely into the sleeve and provide support for the tailgate 25. As shown in FIG. 8, each box sleeve includes therein two spacers 53 which prevent lateral movement of the posts 51 within the sleeves. The spacers 53 are required so that the posts slide relative to the box sleeves previously manufactured with the material container 20. In other manufactured designs of the present invention, the box sleeves 50 can be dimensioned to receive the posts 51 without a need for spacers 53.

A hydraulic cylinder 60 is contained within each box sleeve 50 and post 51. The bottom end of the cylinder includes a bracket 61 which is mounted to the box sleeve 50 by a clevis pin 62. The clevis pin 62 permits the cylinder to pivot slightly within the sleeve 50 and post 51. The output shaft 63 of the hydraulic cylinder 60 includes a ferrule-type receiving member 64 which receives a pin 64 to interconnect the post 51 and the output shaft 63.

As best illustrated in FIG. 7, the tailgate 25 includes a relatively thick flange extension 65 extending inwardly from each upper side edge. Each flange 65 is received in a respective bracket 70 positioned on the top of each cap plate 52. The flange 65 is pivotably retained within the bracket 70 by a clevis pin 71 extending through the bracket and flange. The bracket and pin 70, 71 allow the tailgate 25 to pivot about the pivotal axis which extends through the pins parallel and closely adjacent the upper edge of the tailgate 25.

The tailgate 25 also includes at least one guide rod 80 extending outwardly from each side edge 42 of the tailgate, at a position adjacent the tailgate lower edge 41 (FIGS. 5 and 9). Preferably, the guide rods 80 extend outwardly from each lower side edge a short distance of approximately a few inches. As illustrated, each guide rod 80 engages the outside surface 81 of the box sleeve. The guide rods 80 ride the outside surface 81 of the box sleeve (FIGS. 3-5) to prevent inward pivoting of the tailgate 25.

A guide channel 82 also is mounted to each of the box sleeve outside surfaces 81 (FIGS. 4, 7 and 9). The inner surface of the guide channel is integral with the outer surface 81 of the box sleeve and includes a rear cam surface 83 to aid in guiding the rod 80 into the guide channel 82 when the tailgate 25 is lowered (FIG. 9). The rear surface 84 of the guide channel 82 is of limited vertical height less than the box sleeve outside surface 81. A front cam surface 85 also aids in guiding the rod into the channel when the tailgate is lowered. The rod engages the rear surface 84 and the tailgate 25 cannot pivot outwardly when the rod is within the guide channels 82. Thus, when the tailgate 25 is partially raised and the rods 80 are retained within the guide channels 82, the tailgate cannot pivot outwardly and the bottom edge of the tailgate remains spaced above the bottom wall 21 of the container to allow a discharged metering of material contained therein (FIG. 4).

A pump and reservoir 90 supply the hydraulic fluid necessary to control the hydraulic cylinders 60 which raise and lower the posts 51 and attached tailgate 25 thereto (FIG. 11). A motor 91 controls the pump 90, and first and second hydraulic fluid lines interconnect the fluid inlet nipples 94 on the hydraulic cylinders with the pump 90. A solenoid valve 95 activates a valve mechanism 96 which regulates the flow of hydraulic fluid to the hydraulic cylinders 60 to raise and lower the posts 51 and tailgate in unison so that the tailgate is raised vertically and parallel with the side walls 22. The valve mechanism 96 can be regulated by means positioned in the truck cab or fixed to the frame 11 of the vehicle. The first hydraulic line includes regulator valves 97 to lower the hydraulic pressure supplied to the cylinders when the output shaft 63 is lowered. The hydraulic pressure needed to lower the output shafts 63 having the associated posts 51 and tailgate 25 attached thereto is less than the pressure required to raise same.

In accordance with the present invention, the material handling vehicle 10 as described provides a versatile vehicle which can be used both to meter from the container 20 any material contained therein and to dump any material in a less controlled, complete discharge such as a dump truck. As long as the tailgate 25 is not raised so that the guide rods 80 are disengaged from the guide channels 82, the tailgate cannot pivot outwardly and any sand, salt, or other aggregate material can be discharged in a controlled, metered fashion onto a road bed or other surface.

As illustrated in FIG. 10, an indicator 100 in the form of a longitudinally extending tab is secured to the left post and extends outwardly from the container 20. The indicator tab 100 includes numerals 101 fixed thereon representing two inch increments. Additionally, an indicator pointer 102 is secured adjacent the top end of the box sleeve. When the tailgate 25 is closed, the indicator pointer 102 is positioned at zero. If the tailgate is raised twenty inches, the indicator pointer 102 lies adjacent the numeral twenty on the indicator tab. The indicator tab is visible through the side view mirror on the driver's side of the truck cab. The driver can control the distance the tailgate 25 is raised when the vehicle is in operation. Thus, predetermined distances between the tailgate and bottom wall 21 can be established during driving to vary the distance the tailgate is raised for controlling the quantity of discharge during metering.

If the contents of the material container 20 are to be discharged without metering, the tailgate 25 is fully raised. As the tailgate 25 is raised, the guide rods 80 retract from the guide channel 82 and the tailgate is free to pivot outwardly therefrom. Simultaneously, the front end of the material container is raised so that the container pivots on its rear axis. Any material contained therein slides outwardly from the container. Very large objects, such as steel scrap or tree trunks, also are discharged without interference from the now fully raised and outwardly pivoting tailgate. A the vehicle 10 is advanced, the material contained therein is quickly discharged from the material container.

The foregoing embodiment is to be considered illustrative, rather than restrictive of the invention and the modifications which become within the meaning of range of equivalence of the claims are to be included therein.

I claim:

1. A material handling vehicle comprising
   a frame mounted on wheels for permitting travel along a roadway,
   a substantially rectangular material container comprising a bottom wall, opposite side walls, a front end including a front end wall, and an open rear end,
   means for pivotally mounting said container to said frame for pivotal rotation about a transverse axis so as to lift said front end of said container and cause material in said container to be discharged through said open rear end,
   a one piece, generally rectangular tailgate sized to close said open rear end of said container and including parallel upper and lower edges, and parallel opposite side edges,
   means mounting said tailgate to said container for permitting the tailgate to be selectively moved between
   (1) a closed position wherein said tailgate overlies and closes said open rear end of said container,
   (2) a partially raised position of limited vertical height for allowing a metered discharge in a controlled manner of material held within said container wherein said bottom edge of said tailgate is spaced above said bottom wall of said container no greater than the height of said sidewalls, and
   (3) a fully raised position wherein said tailgate is free to swing outwardly about a pivotal axis which extends parallel to and closely adjacent said upper edge of said tailgate,
   wherein said means mounting said tailgate comprises at least one guide rod extending outwardly from one side edge of said tailgate, with said one guide rod being located adjacent said lower edge of said tailgate, and
   at least one vertically directed guide channel means mounted to one of said side walls adjacent said rear end, with said one guide channel means being positioned so as to engage said one guide rod when said tailgate is in said closed and said partially raised positions, and wherein said one guide channel means includes a rearward surface of a limited vertical height which comprises a significant portion of the height of said side walls corresponding to the partially raised position for guiding the tailgate during raising and preventing rearward pivoting outwardly of said tailgate over the distance said rearward surface extends, and
   power means for selectively moving said tailgate between said three positions.

2. The material handling vehicle as defined in claim 1 wherein said power means comprises a pair of vertically disposed hydraulic lifting members mounted to respective ones of said side walls adjacent said rear end, with each of said hydraulic lifting members including a vertically disposed output member having a free upper end and which is vertically movable with respect to said side walls between a lowered position and a raised position, and interconnecting means pivotally interconnecting the free upper end of each output member with said tailgate along said pivotal axis of said tailgate.

3. The material handling vehicle as defined in claim 1 wherein said one guide channel means includes an inner surface extending substantially the full height of said one side wall, and whereby said inner surface engages said one guide rod in said fully raised position to prevent the inward pivotal movement of said tailgate.

4. A material handling vehicle comprising a frame mounted on wheels for permitting travel along a roadway,
- a substantially rectangular material container comprising a bottom wall, opposite sidewalls, a front end including a front end wall, and an open rear end,
- means for pivotally mounting said container to said frame for pivotal rotation about a transverse axis so as to lift said front end of said container and cause material in said container to be discharged through said open rear end,
- a one piece, generally rectangular tailgate sized to close said open rear end of said container and including parallel upper and lower edges, and parallel opposite side edges,
- means mounting said tailgate to said container for permitting the tailgate to be selectively moved between
  (1) a closed position wherein said tailgate overlies and closes said open rear end of said container,
  (2) a partially raised position of limited vertical height for allowing a metered discharge in a controlled manner of material held within said container wherein said bottom edge of said tailgate is spaced above said bottom wall of said container no greater than the height of said sidewalls, and
  (3) a fully raised position wherein said tailgate is free to swing outwardly about a pivotal axis which extends parallel to and closely adjacent said upper edge of said tailgate,
- said means mounting said tailgate comprising a vertically disposed open sleeve fixedly mounted to each of said sidewalls adjacent said rear end, and a post closely and slidably received in each of said sleeves so as to permit vertical movement of said posts, and with each of said posts including a free upper end which is pivotally connected to said tailgate along said pivotal axis of said tailgate, and with each of said sleeves defining a rearwardly facing vertical guide surface extending along the full length thereof, a pair of oppositely directed guide rods extending outwardly from respective side edges of said tailgate, with said guide rods being positioned to engage and slide along said guide surface during movement of said tailgate between said three positions, and wherein such engagement prevents the inward pivotal movement of said tailgate, and a vertical guide channel mounted to extend along a significant portion of the length of said guide surface of each sleeve a limited distance no greater than the height of said sidewalls corresponding to the partially raised position and so as to engage the rearward side of the associated guide rods when said tailgate is in said lowered and partially raised positions, and so as to guide the tailgate upwardly during raising and to prevent the outward pivotal movement of said tailgate over the distance said vertical guide channel extends, and
- power means for selectively and concurrently moving each of said posts with respect to its sleeve so as to selectively move said tailgate between said three positions.

5. The material handling vehicle as defined in claim 4 wherein each of said posts is hollow, and wherein said power means comprises a vertically disposed hydraulic cylinder disposed within each sleeve and post, with each of said hydraulic cylinders comprising a cylinder fixedly mounted within said sleeve and an output shaft connected to its associated post, whereby operation of said hydraulic cylinders acts to vertically move said posts within their associated sleeves.

6. The material handling vehicle as defined in claim 5 further comprising indicia means for indicating the elevation of said tailgate to the operator of said vehicle.

* * * * *